US011537675B2

(12) United States Patent
Dhillon et al.

(10) Patent No.: US 11,537,675 B2
(45) Date of Patent: *Dec. 27, 2022

(54) SYSTEMS AND METHODS FOR DYNAMIC DATA PROCESSING AND GRAPHICAL USER INTERFACE PROCESSING

(71) Applicant: Included Health, Inc., San Francisco, CA (US)

(72) Inventors: Jesse Dhillon, San Francisco, CA (US); Jyotiwardhan Patil, San Francisco, CA (US); William Dzierson, San Francisco, CA (US); Nupur Srivastava, San Francisco, CA (US); Kenneth Berland, San Francisco, CA (US)

(73) Assignee: INCLUDED HEALTH, INC., San Francisco, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 16/884,527

(22) Filed: May 27, 2020

(65) Prior Publication Data

US 2020/0285682 A1    Sep. 10, 2020

Related U.S. Application Data

(63) Continuation of application No. 15/331,770, filed on Oct. 21, 2016, now Pat. No. 11,120,087.

(51) Int. Cl.

| G06F 16/9535 | (2019.01) |
| G06F 21/62 | (2013.01) |
| G06F 16/20 | (2019.01) |
| G06F 16/25 | (2019.01) |
| G06F 16/30 | (2019.01) |

(Continued)

(52) U.S. Cl.
CPC ......... *G06F 16/9535* (2019.01); *G06F 16/20* (2019.01); *G06F 16/25* (2019.01); *G06F 16/258* (2019.01); *G06F 16/30* (2019.01); *G06F 16/51* (2019.01); *G06F 16/9038* (2019.01); *G06F 21/6209* (2013.01)

(58) Field of Classification Search
None
See application file for complete search history.

(56) References Cited

U.S. PATENT DOCUMENTS

| 8,799,812 B2 | 8/2014 | Parker |
| 9,734,309 B1 | 8/2017 | Allen |

(Continued)

*Primary Examiner* — Amresh Singh
(74) *Attorney, Agent, or Firm* — Finnegan, Henderson, Farabow, Garrett & Dunner, LLP

(57) ABSTRACT

Systems and methods for dynamic data processing and graphical user interface generation are provided. A system may include a network interface configured to request and receive, via a computer network from one or more sources in remote locations, electronic record data associated with an individual; an input filter configured to identify structured and unstructured information in the electronic record data; a data selector configured to analyze the structured and unstructured information; a timeline generator configured to generate, based on the analysis, interface information for displaying an interactive graphical user interface configured to present an event timeline of events in the electronic record data; and a display configured to provide the interactive graphical user interface based on the generated interface information.

20 Claims, 13 Drawing Sheets

(51) Int. Cl.
    *G06F 16/51*      (2019.01)
    *G06F 16/9038*    (2019.01)

(56)           References Cited

U.S. PATENT DOCUMENTS

| | | |
|---|---|---|
| 11,120,087 B2 * | 9/2021 | Dhillon .................. G06F 16/20 |
| 2015/0112979 A1 | 4/2015 | Vittorio |
| 2015/0213202 A1 | 7/2015 | Amarasingham et al. |
| 2016/0092446 A1 | 3/2016 | Nye |
| 2016/0378939 A1 | 12/2016 | Baumberger et al. |
| 2017/0169800 A1 | 6/2017 | Greco et al. |

* cited by examiner

| | ☐ Active Cases  ☐ Archived Cases    700 | | Dr. Teresa Expert ⊙ |
|---|---|---|---|
| Medical Summary | Peter Patient<br>40 years old, Male<br>Left knee grade 3 anterior cruciate ligament (ACL) sprain | | Opinion    ⊛ Single panel |
| | | | For the Patient view an example opinion |
| Timeline | | | Thank you for agreeing to consult on the case and provide an expert opinion. Please write in simple, patient-friendly language and avoid using medical terminology whenever possible. This helps ensure that the patient will understand your recommendations and increases the likelihood that she/he'll follow them! A sample opinion can be viewed here. |
| Medical Records | Initial diagnosis | Left knee grade 3 anterior cruciate ligament (ACL) sprain | |
| | Diagnosis made by | physical exam, MRI, CT | |
| Imaging | Chief complaint | I am an active individual. About a third of the time I play, my knee will buckle, causing severe pain. Within minutes, the pain lapses and I am then able to continue playing. I can run, walk, and cycle with no pain at all. I even trail run for about 20 miles a week in the mountains. I would prefer to avoid surgery, but am worried about causing permanent damage to my knee. | Summary to the patient |
| | | | Our Staff Physician has summarized the patient's pertinent medical history and drafted a brief clinical summary. Please review and edit the summary to ensure that it is accurate and complete. |
| | | | Thank you for allowing me to review your case and provide my opinion. Before I go into answering your questions and providing my recommendations, let me summarize your medical history and concerns based on what I've learned from your medical records and the questionnaire you completed. You are a ..." |
| 701 | HPI | Mr. Patient is a 40 year-old male with a history of left knee pain and instability for the last 2 months secondary to left ACL tear diagnosed by MRI. The pain has been persistent since January. He describes moderate pain, looseness, and instability around the left knee. The pain increases with activity. On 9/24/13, the patient's treating physician noted the presence of a grade 3 ACL sprain, mild left knee effusion, and pain at the end of flexion. MRI of the left knee revealed an ACL tear. He recommended range of motion and strengthening exercises, and surgical ACL reconstruction. | Questions from the patient |
| | | | The patient would like you to answer the following questions. Please respond to each of them, providing robust answers that explain your thinking and rationale. |
| | | | 1. In your opinion, how severe is the injury to my knee?<br>2. Do you believe surgery is required? If so, what is the optimal procedure, and what are the associated risks?<br>3. If reconstruction is recommended, do you recommend autograft or allograft?<br>4. Do you recommend any alternative to surgery? If yes, what are the risks and benefits of these treatments?<br>5. Will avoiding surgical treatment result in permanent damage to the knee? |
| | Proposed treatment | Left ACL reconstruction with autograft vs. allograft. | |
| | Goal of consultation | The patient seeks a second opinion to define the optimal course of treatment. Specifically, he seeks to gain the following information:<br>1. In your opinion, how severe is the injury to my knee?<br>2. Do you believe surgery is required? If so, what is the optimal procedure, and what are the associated risks?<br>3. If reconstruction is recommended, do you recommend autograft or allograft? | Summary of next steps |
| | | | Please summarize your recommendations for the patient and clearly outline the next steps that s/he should pursue. Whenever possible, list next steps in order of decreasing importance (i.e. most important to least important). |

Patient Timeline Builder 1000c

Medical records

From: Renaissance Imaging  To: DR  Page 1/2  Date 10/10/2013 1:34:56 PM
Stanford Hospital
Orthopedic Imaging Center
300 Pasteur Drive
Palo Alto, CA 94301
(650) 793-4000

Patient Name: Michael Miller
Date of Birth: 06-16-1978  Age
Procedure Date:
Accession #:
Procedure(s): MRI KNEE LEFT wdzierson
02-03-1999 // Radiology: Note // Hyperextension injury, knee effusion. Meniscal tear. Sharp pain. |

CLINICAL INFORMATION: Hyperextension injury a month ago. Knee effusion. Rule out ACL tear. Meniscal tear. Sharp pain.

TECHNIQUE: The following MR pulse sequences were obtained on a 3 Tesla magnet at Renaissance Imaging Center, Westlake Village, Claifornia: Axial PD fat sat, coronal and sagittal PD and PD fat sat images were obtained. Images were interpreted on a high-resolution PACS

FINDINGS:

Medial compartment: No evidence for meniscal tear or chondral defect. There is slight thickening scarring of the MCL consistent with an old sprain. No acute change identified. There is edema and irregularity of the capsular attachments to the meniscus consistent with a capsular sprain. No meniscus tear identified.

Lateral compartment: There is faint bone marrow edema of the posterior lateral tibia consistent with a nearly healed trabecular injury. Lateral ligaments are intact. No evidence for lateral meniscus tear.

Intercondylar notch: The Acl is torn as can be seen on sagittal image number 13. The PCL is intact.

Patellofemoral joint: No evidence for chondral defect. The patellar and quadriceps tendons are intact.

Other findings: There is a small joint effusion present.

IMPRESSION:
1. ACL tear

Events

| Event Date | Event Name |
|---|---|
| 02-03-2013 | Procedure: Allograft |

| Event description | Page # |
|---|---|
| Patient underwent allograft | 102 |

Image URL

Timeline preview

Procedure: Allograft   January 02, 2013
Allograft for torn ACL

See page 6

Radiology: Note   February 03, 1999
Hyperextension injury, knee effusion. Meniscal tear. Sharp pain.

See page 8

*FIG. 10c*

SYSTEMS AND METHODS FOR DYNAMIC DATA PROCESSING AND GRAPHICAL USER INTERFACE PROCESSING

This application is a continuation of U.S. application Ser. No. 15/331,770, filed Oct. 21, 2016, which is hereby incorporated by reference in its entirety.

TECHNICAL FIELD

Disclosed embodiments are directed to data processing, such as presentation of data from aggregated electronic files including textual documents, images, and videos, and processing and generation of graphical user interfaces based on the aggregated electronic files. Some embodiments are directed to generation of graphical user interfaces from diverse media types of data that are gathered, associated, created, indexed, formatted, and otherwise analyzed to determine relationships between elements in the data to generate a single index and associated graphical user interface.

BACKGROUND

An ever increasing amount of data and data sources are now available to researchers, analysts, organizational entities, and others. This influx of information allows for sophisticated analysis to solve problems and draw conclusions, but in some areas, the availability of conclusions from this data is lacking due to inadequate data processing methods and ineffective graphical user interfaces.

Often, raw data files are unstructured, and large data sets can contain data points falling into one or multiple known categories. Furthermore, raw data files usually contain information in various, non-uniform formats, such as different forms or documents with handwritten notes. Thus, large amounts of complex data received from various sources cannot be analyzed uniformly for presentation in a graphical user interface.

Moreover, in many cases, data points in the raw data files do not provide clear indication regarding an appropriate categorization or relationship to data points in other files. Moreover, effective ways to expand the number of categorized data points can be time consuming and require large amounts of manual intervention.

Without effective data drive methods to drive the data file analysis and graphical user interface generation, users of the data sets cannot draw effective conclusions about the data as a whole.

SUMMARY

Disclosed embodiments relate to computerized systems and methods for dynamic data analysis, indexing, and timeline generation.

In one embodiment, a system for dynamic data processing and graphical user interface generation is provided. The system may include a network interface configured to request and receive, via a computer network from one or more sources in remote locations, electronic record data associated with an individual; an input filter configured to identify structured and unstructured information in the electronic record data; a data selector configured to analyze the structured and unstructured information; a timeline generator configured to generate, based on the analysis, interface information for displaying an interactive graphical user interface configured to present an event timeline of events in the electronic record data; and a display configured to provide the interactive graphical user interface based on the generated interface information.

In another embodiment, a computer-implemented method for dynamic data processing and graphical user interface generation is provided. The method may include: requesting and receiving, via a computer network from one or more sources in remote locations, electronic record data associated with an individual; identifying, by at least one processor of a computing system using an input filter, structured and unstructured information in the electronic record data; analyzing, by the at least one processor using a data selector, the structured and unstructured information; generating, based on the analysis and using a timeline generator, interface information for displaying an interactive graphical user interface configured to present an event timeline of events in the electronic record data; and providing for display the interactive graphical user interface based on the generated interface information.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 7 is a second example of a user interface consistent with embodiments of the present disclosure.

FIG. 8 is a third example of a user interface consistent with embodiments of the present disclosure.

FIGS. 10*a*-10*c* illustrate a fifth example of user interfaces consistent with embodiments of the present disclosure.

DETAILED DESCRIPTION

Figure 1:
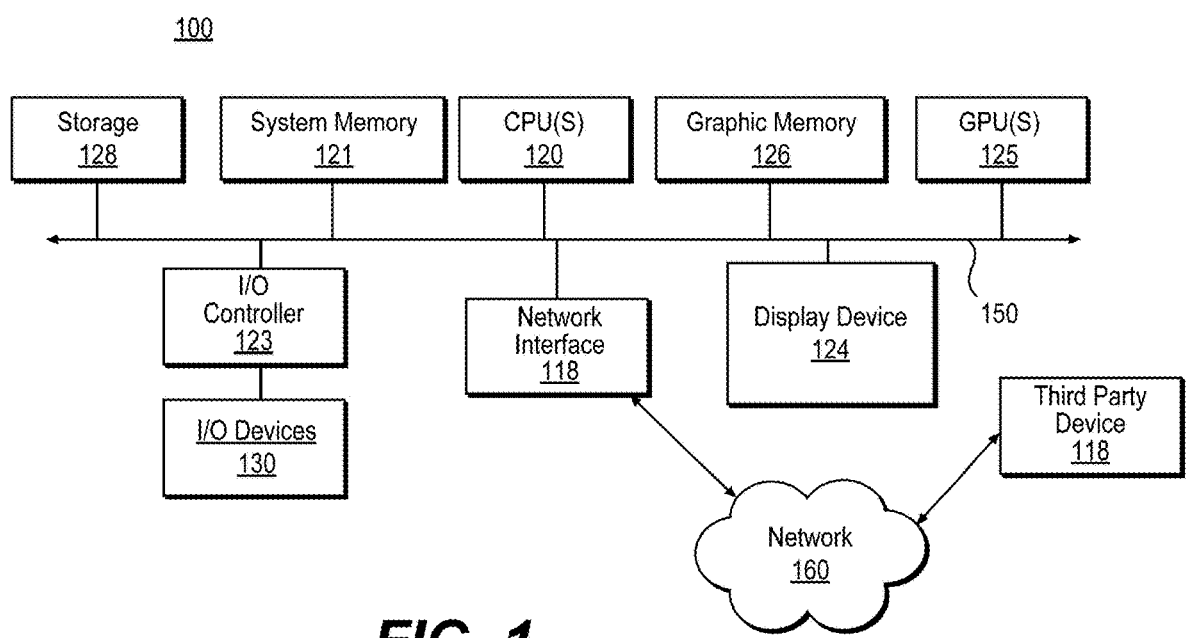
FIG. 1 is a block diagram of an exemplary computing device, consistent with embodiments of the present disclosure.

Disclosed embodiments are directed to systems and methods for analyzing data files received from a multitude of sources, generating an index of the received files, and generating a dynamic and customized graphical user interface based on the data files and analysis. In some embodiments, the disclosed embodiments can improve data analysis and presentation for medical professionals to make effective diagnoses. Misdiagnoses of medical conditions, illnesses, or injuries are common occurrences that often result in complications, excessive medical expenses, and morbidity. The misdiagnoses may be the result of simple human error or a lack of necessary information. Proper medical diagnoses generally require a large quantity of medical data to provide a comprehensive picture of the patient's health. Thus, physicians require up-to-date and complete medical histories, but the required information may be physically dispersed and/or not accessible when needed. Traditional medical record systems are difficult to manage and distribute due to privacy regulations and a lack of communication between facilities.

For example, a patient may have been treated by a primary physician, a number of specialists, and a physical therapist for a condition, but a diagnosing physician may not have access to all of the information from the previous treatments. One of the specialists may have taken an X-ray image that provides vital information, but the current process of transferring the X-ray image to other facilities is cumbersome because of the sensitivity of the information. Even if the X-ray image is sent to the diagnosing physician, it may be only available in a hardcopy which may become lost among volumes of medical records.

Moreover, traditional medical records are often disorganized and difficult to review quickly and efficiently. For example, a middle-aged patient may have records from more than a dozen doctors, and each record may have different formatting and types of content. Thus, physicians are often unable to obtain a full understanding of a patient's health condition quickly and efficiently.

The disclosed system is directed to overcoming or mitigating one or more of the problems set forth above and/or other problems in the art.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide systems and methods for gathering information from a variety of sources, extracting data from the information, and prioritizing the data into indexes and timelines. The index and timelines may ensure access of prioritized data to decision-makers and/or experts providing second opinions. Some embodiments of the technology may be applied to records of the medical field and may improve the availability of expert medical opinions. However, the embodiments described herein may be applied to many other fields. Descriptions and applications related to specific domains do not preclude the application of the described embodiments to other technologies of fields.

FIG. 1 is a block diagram of a computing system 100. In some embodiments, system 100 may be a server providing the functionality described herein. Further, system 100 may be a second device providing the functionality described herein or receiving information from a server to provide at least some of that information for display.

System 100 may include one or more central processing units (CPUs, or processors) 120 and system memory 121. System 100 may also include one or more graphics processing units (GPUs) 125 and graphic memory 126. CPUs 120 may be single or multiple microprocessors, field-programmable gate arrays, or digital signal processors capable of execution sets of instructions stored in a memory (e.g., system memory 121), a cache, or a register. CPUs 120 may contain one or more registers for storing variable types of data including, inter alia, data, instructions, floating point values, conditional values, memory addresses for locations in memory (e.g., system memory 121 or graphic memory 126), pointers, and counters. CPU registers may include special purpose registers used to store data associated with executing instructions such as an instruction pointer, instruction counter, and/or memory stack pointer. System memory 121 may include a tangible and/or non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive and/or flash memory, processor cache, memory register, or a semiconductor memory. System memory 121 may be one or more memory chips capable of storing data and allowing direct access by CPUs 120. System memory 121 may be any type of random access memory (RAM), or other available memory chip capable of operating as described herein.

CPUs 120 may communicate with system memory 121 via a system interface 150, sometimes referred to as a bus. GPUs 125 may be any type of specialized circuitry that may manipulate and alter memory (e.g., graphic memory 126) to provide and/or accelerate the creation of images. GPUs 125 may store images in a frame buffer for output to a display device such as display device 124. GPUs 125 may have a highly parallel structure optimized for processing large, parallel blocks of graphical data more efficiently than general purpose CPUs 120. Furthermore, the functionality of GPUs 125 may be included in a chipset of a special purpose processing unit or a co-processor.

CPUs 120 may execute programming instructions stored in system memory 121 or other memory, operate on data stored in memory (e.g., system memory 121) and communicate with GPUs 125 through the system interface 150, which bridges communication between the various components of system 100. In some embodiments, CPUs 120, GPUs 125, system interface 150, or any combination thereof, are integrated into a single chipset or processing unit. GPUs 125 may execute sets of instructions stored in memory (e.g., system memory 121), to manipulate graphical data stored in system memory 121 or graphic memory 126. For example, CPUs 120 may provide instructions to GPUs 125, and GPUs 125 may process the instructions to render graphics data stored in the graphic memory 126. Graphic memory 126 may be any memory space accessible by GPUs 125, including local memory, system memory, on-chip memories, and hard disk. GPUs 125 may enable displaying of graphical data stored in graphic memory 126 on display device 124.

System 100 may include display device 124 and input/output (I/O) devices 130 (e.g., a keyboard, a mouse, or a pointing device) connected to I/O controller 123. I/O controller 123 may communicate with the other components of system 100 via system interface 150. It is appreciated that CPUs 120 may also communicate with system memory 121 and other devices in manners other than through system interface 150, such as through serial communication or direct point-to-point communication. Similarly, GPUs 125 may communicate with graphic memory 126 and other devices in ways other than system interface 150. In addition to receiving input, CPUs 120 may provide output via I/O devices 130 (e.g., through a printer, speakers, or other output devices).

Furthermore, system 100 may include a network interface 118 to interface to a network 160 through a variety of connections including, but not limited to, standard telephone lines, LAN or WAN links (e.g., 802.11, T1. T3, 56 kb, X.25), broadband connections (e.g., ISDN, Frame Relay, ATM), wireless connections, or some combination of any or all of the above. Network interface 118 may comprise a built-in network adapter, network interface card, PCMCIA network card, card bus network adapter, wireless network adapter, USB network adapter, modem or any other device suitable for interfacing system 100 to any type of network 160 capable of communication and performing the operations described herein.

System 100 may also be configured to send and/or receive data to/from one or more third party devices 170 through network 160. Computer system 100 may be configured to send-only, receive-only, or send and receive to/from third party device 170 depending on assigned permissions. For example, computer system 100 may only send data to a third party device 170 with only read-only access to data of storage 128, and may only receive data from a third party device 170 recognized as only a data source. Computer system 100 may also be configured to send and receive data from a third party device 170 permitted to read and update data of storage 128. Third party device 170 may be a personal computing device such as, for example, a general purpose or notebook computer, a mobile device with computing ability, a tablet, smartphone, wearable device such as Google Glass™ or smart watches, or any combination of these computers and/or affiliated components. Third party device 170 may also include app(s), which when executed causes computer terminal 140 to perform processes related to sending and/or receiving to/from system 100. Third party device 170 may be associated with patients, physicians, hospitals, and insurance companies.

Figure 2:
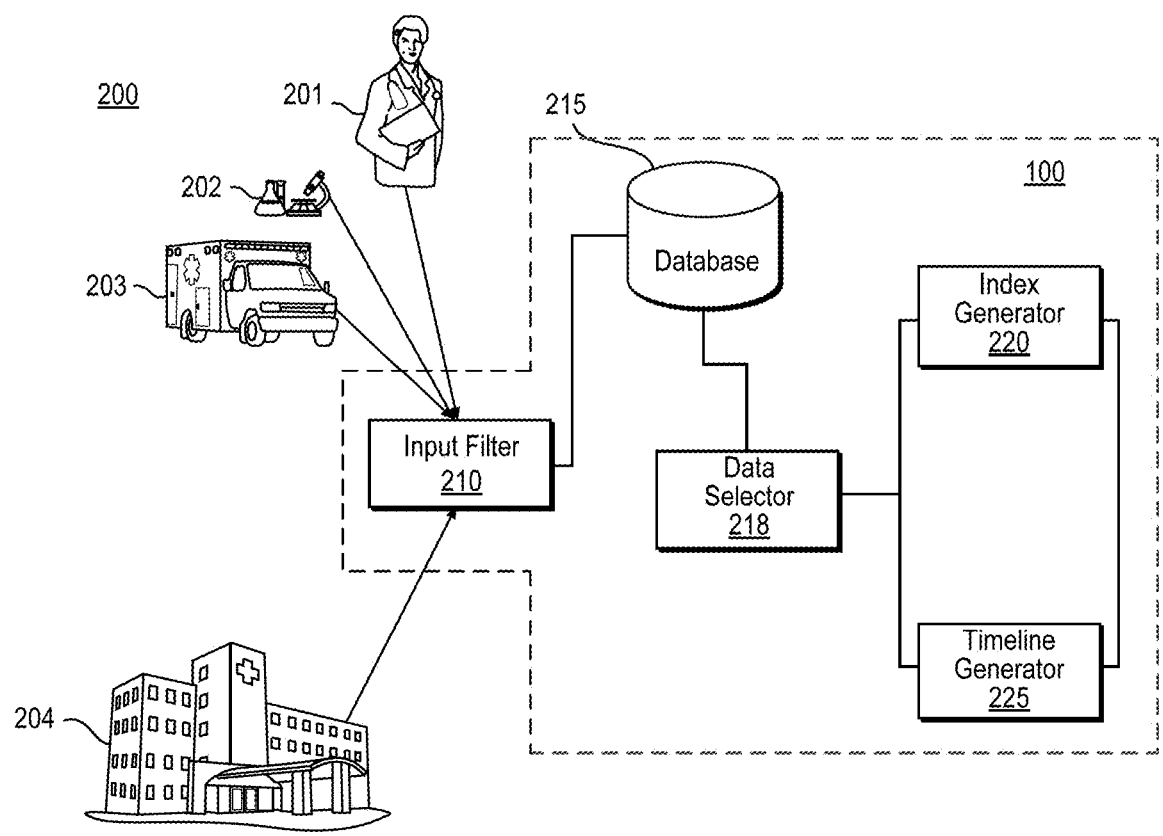
FIG. 2 is a block diagram representing an exemplary system for processing data, consistent with embodiments of the present disclosure.

FIG. 2 is a block diagram representing exemplary processes of system 100 for processing data. System 100 may have a number of modules including, for example, an input filter 210, a database 215, a data selector 218, an index generator 220, and a timeline generator 225. System 100 may implement input filter 210, data selector 218, index generator 220, and timeline generator 225 to receive data from a variety of sources and process the data by extracting aspects of the data. The data may then be stored, retrieved, and outputted, for example, in indexes and/or timelines. The indexes and/or timelines may then be display on a display device similar to display device 124 in FIG. 1. For example, system 100 may request and accept records from data sources (e.g., data sources 201-204), extract metadata from the received data (e.g., using input filter 210), store the data in database 215, select a subset of the data (e.g., using data selector 218) according to the nature of a request, and populate indexes and timelines to be displayed (e.g., using index generator 220 and timeline generator 225). By gathering, analyzing, and storing the data, the system 100 may allow for wider availability of health care solutions.

The data may originate from a variety of sources and may be in a variety of forms. In a healthcare context, the data may include any obtainable medical record associated with an individual such as a patient. For example, system 100 may receive data from, inter alia, physician documents 201, laboratory testing 202, ambulatory charts 203, and/or hospital records 204. Documents 201 may be received from physicians, such as doctors, nurses, hospital staff members, pharmacists, specialists, physical therapists, psychotherapists, dentists, and any other individual that may generate, receive, and/or store health records. Accordingly, the physicians may be associated with institutions, such as hospitals, private practices, urgent care facilities, schools, nurseries, pharmacy, in-home practices, and/or assisted living facilities. Laboratory testing 202 may include any records generated by medical laboratories, such as blood and tissue work. Ambulatory charts 203 may include charts and records generated on an outpatient basis. Hospital records 204 may include records from any hospital department, such as prenatal, cardiology, emergency, radiology, oncology, surgery, and intensive care. For example, data sources 201-204 may relate to and include information pertaining to medical events, physician orders, vaccinations, prescriptions, imaging, diagnoses, and/or symptoms. It is appreciated that the above mentioned sources are exemplary. Any source of information that may be accessed and may provide relevant data, may contribute to the corpus of data available to system 100. The data may be selectively requested and accepted based on relevance to a patient or a condition of the patient, according to privacy statutes and regulations.

Additionally, data sources 201-204 and the data provided by those sources may be dynamic. Additional data sources may continually be added, and data from those sources may be continually processed and updated. As system 100 progresses, more data may be obtained and processed for later use. System 100 may continuously or intermittently request data pertaining to a patient. The request may be in the form of communications, such as emails or push notifications to a physician via third party device 170. The request may also be in the form of directly accessing other databases and retrieving data, via network interface 118. System 100 may also receive data by data sources 201-204 directly uploading the data on a website or file sharing server accessible through network interface 118.

Because of the diversity of the data and data sources provided by data sources 201-204, input filter 210 may be used for extracting and organizing data. Input filter 210 can be a module, which is a packaged functional hardware unit designed for use with other components (e.g., portions of an integrated circuit) or a part of a program (stored on a computer readable medium) that performs a particular function of related functions. In particular, input filter 210 processes the data provided by each data source 201-204 before storing the data in database 215. Processing may include, for example, recognizing the source and type of data, performing optical character recognition (OCR) to make data searchable, extracting dates and/or keywords, generating metadata, and reorganizing the data as related to pre-determined categories or classifications. Input filter 210 may use a variety of mechanisms to process the data depending on the format and nature of the data and/or data source. After processing the data, input filter 210 may store the original data and/or any processed data in database 215.

Database 215 may utilize one or more storage mechanisms based on any tangible and/or non-transitory storage or memory. This may include, but is not limited to, the types of system memory 121 and storage 128 described in relation to FIG. 1. Further, database 215 may store the data in a variety of formats. For example, data storage 415 may be an object-relational database, a non-relational database, a full-text indexed data storage, and/or other database system.

Data selector 218 may be a module configured to receive a request and retrieve data from database 215 for use, for example, by timeline generator 220 and index generator 225, which may also be modules. Data selector 218 may consider the requestor, the patient, the condition, and any relevant permissions (e.g., access control lists) to acquire relevant data from database 215. For example, data selector 218 may receive a request based on a patient and a specific condition. Data selector 218 may determine what permissions the requestor has to data pertaining to the patient, and retrieve relevant and permitted data to be outputted to index generator 220 and/or timeline generator 225.

Index generator 220 and timeline generator 225 are modules that may analyze the data, determine the most effective organization of the data based on the request, and display the data to the requestor. Index generator 220 and timeline generator 225 may be configured to organize and display data based on permissions and requirements of the request. In some embodiments, index generator 220 and/or timeline generator 225 may be configured to display metadata, tags, and extracted data from the records to provide a synopsis of the records in a variety of different manners. For example, index generator 220 may display data from the records and generate hyperlinks that may provide easy access to a timeline. In some embodiments, index generator 220 may receive portions of medical records pertaining to a patient from a variety of different healthcare systems and arrange the pieces of records based on a specific condition of the patient. Timeline generator 225 may display data from the records associated with health events in a chronological order in the form of the timeline. In some embodiments, timeline generator 225 may be configured to display a predetermined number of portions of medical records generated during a predetermined time period. For example, index generator 220 may generate a comprehensive set of medical records pertaining to a patient, while timeline generator 225 may generate a subset of medical records pertaining to the patient during one or more selected time periods, or a subset of all of the medical record data corresponding to a particular condition or event. Index generator 220 and timeline generator 225 may also provide references and/or direct access to the full version of the records, for example, through interactive hyperlinks in the portions of the timeline associated with each health event.

Figure 3:
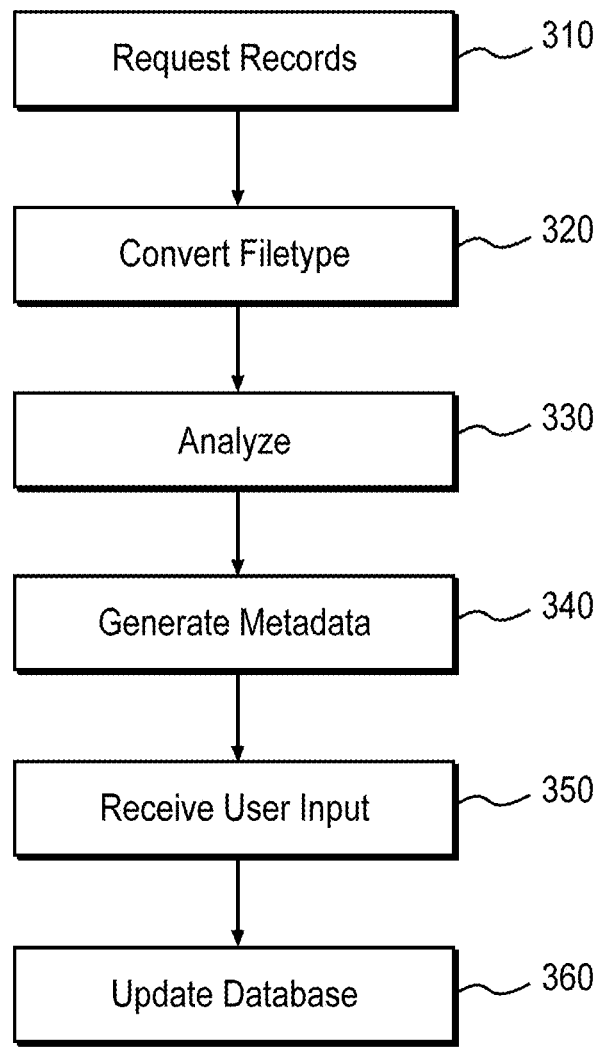
FIG. 3 is a flowchart of an exemplary method for processing data of records, consistent with embodiments of the present disclosure.

FIG. 3 is a flowchart of an exemplary method 300 for evaluating data sources and populating a database, such as database 215 of FIG. 2. It will be readily appreciated that the illustrated procedure may be altered to delete steps or further include additional steps. System (e.g., system 100 from FIG. 1) may request (step 310) data associated to related events from a variety of data sources (e.g., data sources 201-204). Data from data sources 201-204 may be in a variety of forms and related to one or more subjects being considered. In a healthcare context, the data may include personal medical records from, but not limited to, hospitals, general physicians, pharmacists, physical therapists, psychotherapists, and dentists. For example, after a patient is registered in system 100, system 100 may obtain identities and/or locations of healthcare systems in possession of the patient's records based on the patient's claims provided by the employer, locations provided by the patient during the sign up process, names of institutions contained in an existing record, or the like. In some embodiments, a triage collection process may also be performed, during which a medical professional associated with system 100 determines the importance of a medical record that is to be collected and whether a workflow to collect additional information for the medical record is to be initiated. The records may include any number of different types of documentation. For example, the records may include written opinions, diagnoses, orders, prescriptions, and X-ray images.

After obtaining the records, system may convert (step 320) the file type of the received records using a converter. For example, system 100 may be configured to receive the documents as a first file type (e.g., portable document format (pdf)) and convert the documents to a second file type (e.g., portable network graphics (png)). System 100 may merge records or divide pages of the records into different files. System 100 may also be configured execute software to perform OCR, making the documents readable by system 100. System may be further configured to compare received records and delete duplicate records. For example, system 100 may remove information that appears repeatedly such as the patient's identification information (e.g., patient's name, gender, date of birth) the patient's identification information from the received records in the file conversion process. Correspondingly, when a request to view the medical records of a patient is received, system 100 may automatically filter and/or discard repeated content to avoid repeatedly displaying the patient identification information in each medical record index or health event timeline.

Figure 4A:
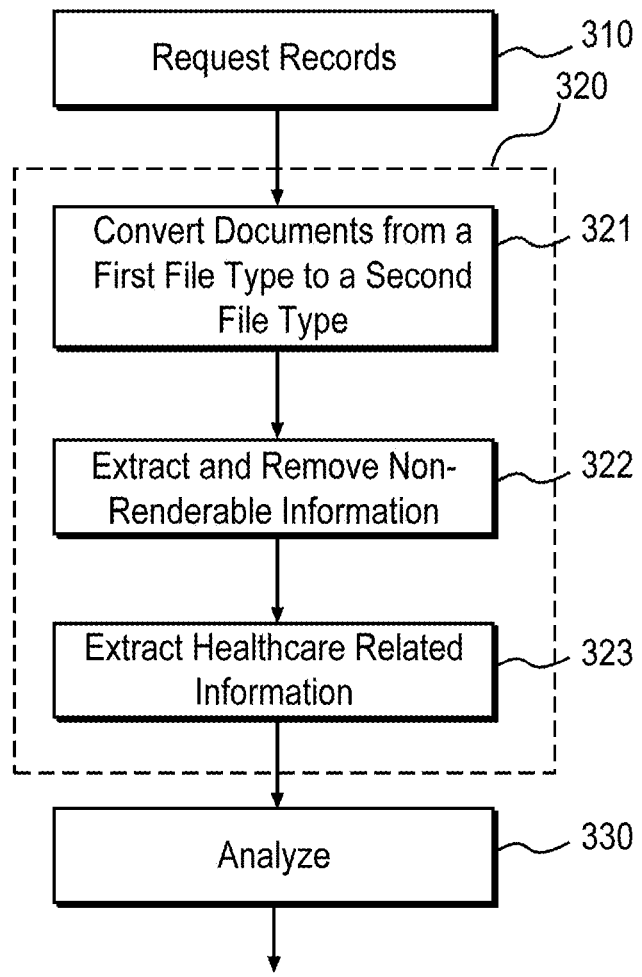
FIG. 4*a* is a flowchart of an exemplary method for processing data of records, consistent with embodiments of the present disclosure.

FIG. 4a is a flowchart of a method for processing data of records, consistent with embodiments of the present disclosure. As shown in FIG. 4a, in step 321, system 100 may convert documents from a first file type (e.g., a .pdf file type) to a second file type (e.g., a .png file type) using a converter.

In step 322, system 100 may extract non-renderable information from the documents and remove the non-renderable information in the converted file. For example, where an OCR operation is performed on a .pdf file, system 100 may remove the OCR information that is not representable in the converted .png file. In some embodiments, the non-renderable information, such as the OCR information, may be included in the metadata generated by system 100.

In step 323, system 100 may extract healthcare related information in the converted file. For example, system 100 may extract information relating to medical observation and/or diagnosis of the patient in the document and leave out the patient identification information that is existent in system 100. In some embodiments, system 100 may extract healthcare related information according to a predetermined format of the document, to extract structured information from the document. For example, system 100 may identify a region in the document that contains medical observation and/or diagnosis information of the patient according to a predetermined format of the document, and extract the relevant healthcare information. In some embodiments, system 100 may extract unstructured information, such as information that does not appear in a formatted field on the document, information that does not have any label, and/or information that cannot be classified to determine an information type or context. In some embodiments, system 100 may automatically omit or delete duplicate information. As system 100 can store multiple pieces of medical records for a patient, by removing duplicate information and extracting relevant healthcare information contained in the records, the medical record index and health event timeline may be displayed in a manner that facilitates a viewer to identify important healthcare information.

Figure 4B:
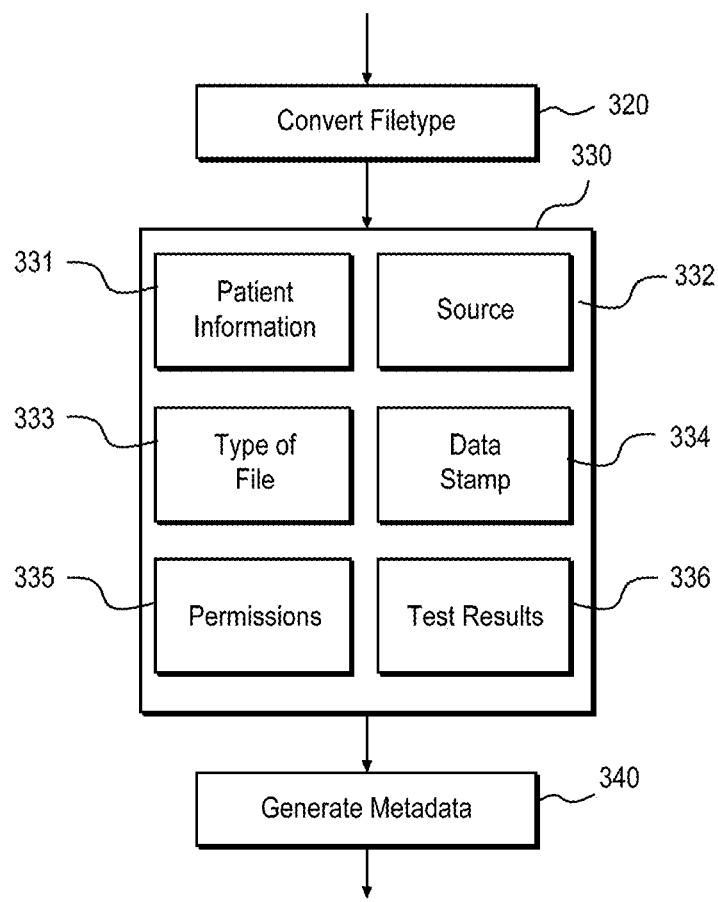
FIG. 4*b* is a flowchart of an exemplary method for analyzing data of records, consistent with embodiments of the present disclosure.

After converting the file type, system 100 may analyze (step 330) the data. For example, as depicted in FIG. 4b, system 100 may extract a variety of types of information from the records. System 100 may extract patient information 331, a source 332 of the records, a type 333 of the records, a date stamp 334 of the records, permissions 335 of the records, and/or any test results 336. The data 331-336 may be pulled from data fields associated with the records or may be pulled directly from text or images according to OCR. For example, system 100 may be configured to recognize a single or combination of words to determine test results. System 100 may also analyze images to detect abnormalities.

For patient information 331, system 100 may extract the patient's biographic information, such as first name, last name, date of birth, address, and social security information, and the patient's medical record number (MRN) in a remote healthcare system. System 100 may also be configured to extract demographic information, such as race, ethnicity, occupation, religion, and health insurance. System 100 may be further configured to extract physical characteristics, such height, weight, allergies, and previous known ailments.

For source 332, system 100 may be configured to identify whether the records came from, for example, a primary physician, a specialist (e.g., dermatologist, a neurologist, a cardiologist), a non-physician provider (e.g., a physical therapist, a registered nutritionist), or an ER doctor. System may also be configured to identify the institution (e.g., Kaiser, Sutter Health, UCSF, Governmental institution, etc.) from which the records came from. System 100 may be further configured to identify who created the record, who edited the record, and/or who uploaded the record onto system 100.

For type 333, system 100 may be configured to classify the record based on a number of data types. In some embodiments, the data may be classified an observation, a stress test, images (e.g. X-ray, an MRI), a cholesterol test, a prescription, or blood work results. For example, the data may be classified as one of the following types of images: Computed Radiography, Computed Tomography, Magnetic Resonance, Nuclear Medicine, Biomagnetic imaging, Color flow Doppler, Duplex Doppler, Diaphanography, Endoscopy, Laser surface scan, Positron emission tomography (PET), Radiographic imaging (conventional film/screen), Single-photon emission computed tomography (SPECT), Thermography, X-Ray Angiography, Radio Fluoroscopy, Radiotherapy Image, Radiotherapy Dose, Radiotherapy Structure Set, Radiotherapy Plan, RT Treatment Record. Hard Copy, Digital Radiography, Mammography, Intra-oral Radiography, Panoramic X-Ray, General Microscopy, Slide Microscopy, External-camera Photography, Presentation State, Audio, Electrocardiography, Cardiac Electrophysiology, Hemodynamic Waveform, SR Document, Intravascular Ultrasound, Ophthalmic Photography. Stereometric Relationship, Optical Coherence Tomography, Ophthalmic Refraction, Ophthalmic Visual Field, Ophthalmic Mapping, Key Object Selection, Segmentation, and other types of imaging data.

For date stamp 334, system 100 may be configured to determine the date the record was created, updated, recorded, and/or any other dates pertaining to the record, such as previous consultations or future scheduled appointments. Date stamp 344 may also include dates pertaining to any condition, such as how long pain has persisted according to the patient and the projected recovery according to the physician.

For permissions (e.g., access control lists) 335, system 100 may be configured to recognize any previously assigned permissions to the record. For example, a physician that created the medical record may generate metadata determinative of who is permitted to view and/or edit the record. For example, the records may be permitted access to one or more of an expert providing a second opinion, the patient, immediate friends and family of the patient, and/or an insurance adjuster. System 100 may also be configured to generate permissions based on the type 333, the source 332, or the results 336 of the records. For example, system 100 may be configured to allow family members to have access to date stamps 334 but not test results 336.

For test results 336, system 100 may be configured to determine results based on text, image, and/or data field recognition. For example, the results may be generated by system 100 scanning the records and recognize descriptions, numbers, and/or units to extract numerical results, such as cell counts or bone densities. System 100 may also be configured to extract results from data fields of recognized forms. System 100 may be further configured to recognize and extract results in the form of medical imaging, such as X-rays, MRI, medical ultrasonography or ultrasound, endoscopy, electrocardiography (ECG), and any other types of imaging.

In some embodiments, system 100 may be configured to add additional information to the records, such as triage information. For example, a medical specialist associated with system 100 may analyze the received records and provide a ranking of the records indicating the perceived level of importance of the records based on the relevant patient condition. Some records may be ranked as critical to the patient's condition, while other records may be ranked as tangential to the patient's condition. Triage information provided by the medical specialist may be added to the corresponding records by system 100. In doing so, a medical professional using system 100 may retrieve records of highly importance for review in an emergency scenario that does not permit a thorough examination of the patient's medical record.

After analyzing the data, system 100 may generate (step 340) metadata. For example, system 100 may alter the records obtained from data sources 201-204 with the metadata relating to data 331-336, as illustrated in FIG. 4b. The metadata may facilitate searching, classifying, and retrieving the records. The metadata may include structural metadata, detailing the organization of the data of the record. The metadata may also include administrative metadata, detailing the type, the source, and the date stamping. The metadata may be hierarchical, such that relationships are created between fields of data. For example, data related to a medical condition (e.g., a broken arm) may be categorized and accessible through a query of the medical condition.

After generating the metadata, system 100 may receive (step 350) user input. The user input may provide tags or metadata to the records. The tags may be annotations saved in the records to provide additional information, such as comments or highlights. The user input may also add/subtract metadata or permissions for each of the records. After receiving the user input, system 100 may save (step 360) the extracted data and original records in database 215. The steps of method 300 may be performed by one or more different individuals at different times. For example, the records or extracted data may be saved to database 215 (step 360) following any step 310-350, and the records and/or extracted data may be retrieved prior to a subsequent step 310-350. Steps 310-360 may also be repeated by different individuals. For example, system 100 may receive user input (step 350) from multiple different users. Steps 310-360 may be performed in different orders.

Figure 5:
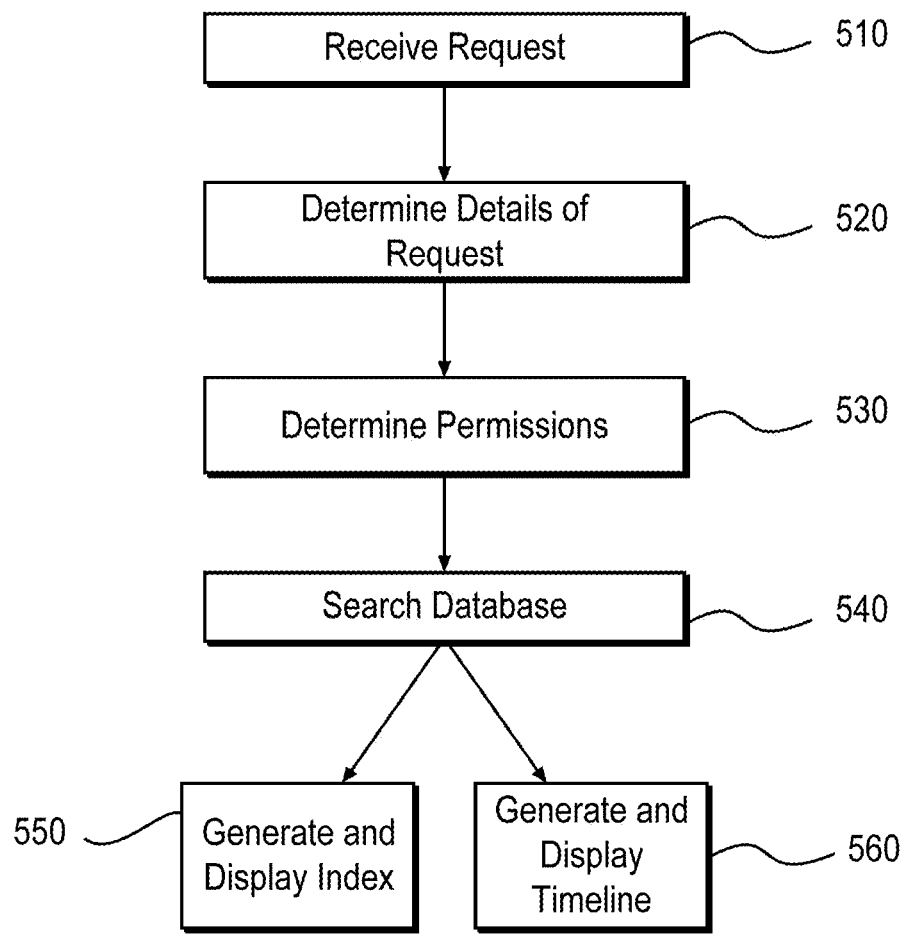
FIG. 5 is a flowchart of an exemplary method of generating an output, consistent with embodiments of the present disclosure.

FIG. 5 is a flowchart of an exemplary method 500 for retrieving data and generating an index and/or a timeline. It will be readily appreciated that the illustrated procedure may be altered to delete steps or include additional steps. A device (e.g., system 100 from FIG. 1) may receive a request (step 510) based on desired information. The request may be received from third party 170 via network interface 118 through a secure, password protected terminal.

After receiving the request, system 100 may determine (step 520) the details of the request. For example, system 100 may be configured to determine the requestor, the patient, and any specific conditions that are being queried. The requestor may be determined by the password protected login of the terminal.

After determining details of the request, system 100 may determine (step 530) the permissions of the requestor. Based on the permissions, system 100 may limit the amount or type of records that may be accessed by the requestor. This step may be performed through a look-up chart mapping the requestors with any associated patients. The look-up chart may also provide the records to which the requestor has permissions. For example, the medical record index and timelines may be displayed in different levels of details according to the permission of the requestor. A records collector, a doctor, and a family member of the patient may each have a different view of the timeline and medical record index based on their permissions.

After determining the permissions, system 100 may search (step 540) database 215 and retrieve data pertaining to the request. Device 200 may search database 215 based on metadata, extracted data, and/or tags. Device 200 may also access categories of data stored in database 215 pertaining to the request.

System 100 may build and display (step 550) an index. System 100 may dynamically generate the index from the records based on the request, the requestor, permissions of the requestor, the patient, and the condition. For example, an index generated for an expert configured to provide a second opinion may be more inclusive than an index generated for a family member of the patient. System 100 may organize the index based on tags and metadata from the received records. The index may include hyperlinks, allowing quick access to the records and/or a timeline.

Figure 8:
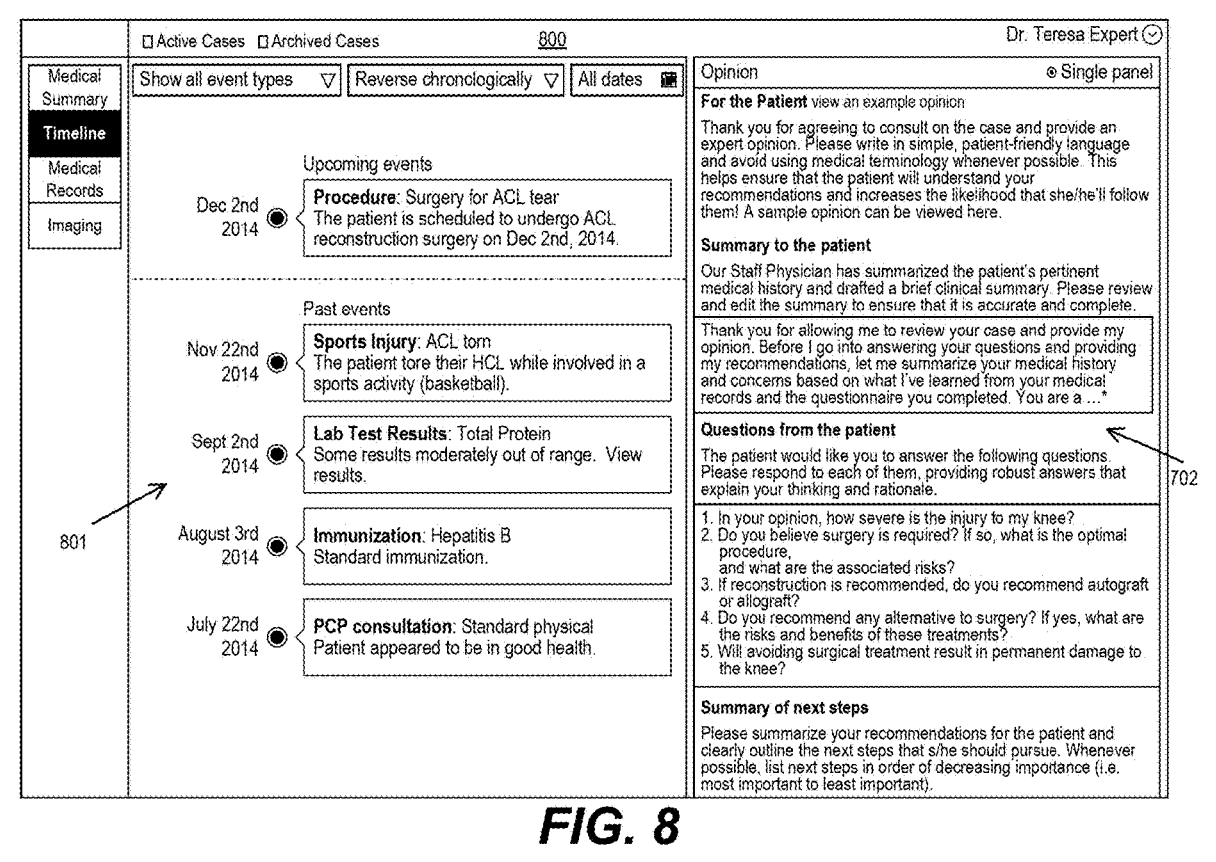

System 100 may also build and display (step 560) the timeline as exemplified in FIG. 8. In some embodiments, system 100 may generate interface information for displaying an interactive graphical user interface that includes the timeline. The timeline may provide a chronological listing of data extracted from the records. For example, the timeline may include medical events, procedures, and consultations. The timeline may also be dynamically generated from the records based on the request, the requestor, permissions of the requestor, the patient, and the condition. The timeline may include hyperlinks, allowing quick access to the records.

Figure 6:
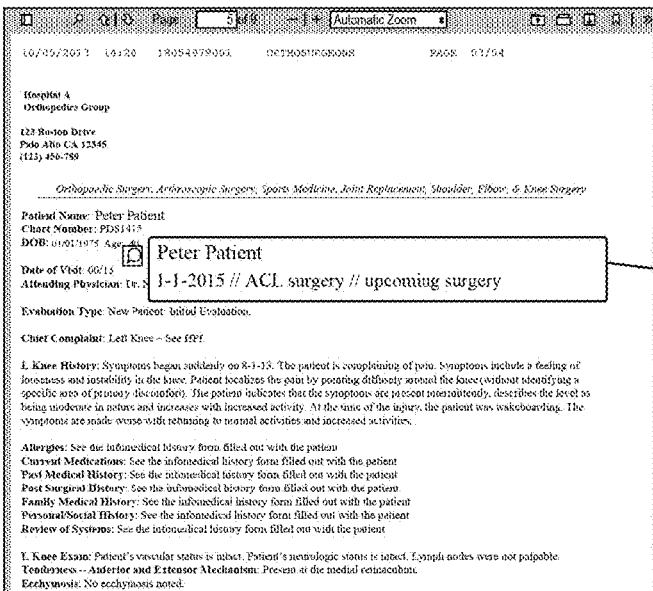
FIG. 6 is a first example of a user interface consistent with embodiments of the present disclosure.

FIG. 6 is a first example of a user interface 600 consistent with embodiments of the present disclosure. As depicted in FIG. 6, system 100 may be configured to output a user interface 600 including a medical records field 601. In the medical records field 601, system 100 may display records acquired in step 310. System 100 may also tag data from the records and extract the data and/or generate metadata based on the tagging. For example, system 100 may extract the date of an ACL surgery to be compiled into a timeline. System 100 may also extract additional information about the surgery, such as the location, the attending physician, and the evaluation type. System 100 may further extract other physical information, such as known allergies and medical history. The extraction may be automated by system 100 or may be performed manually. When performed manually, system 100 may receive manual input through data field 602 in order to compile the index and/or timeline. Data field 602 may receive information pertaining to an event, such as an event date, an event name, an event description, a reference number (e.g., page #), and an image URL to link the full record to the timeline. After entry of data into data field 602, the event may be added to the timeline. System 100 may also provide a timeline preview 603 of data that has been previously compiled in the timeline.

Figure 9:
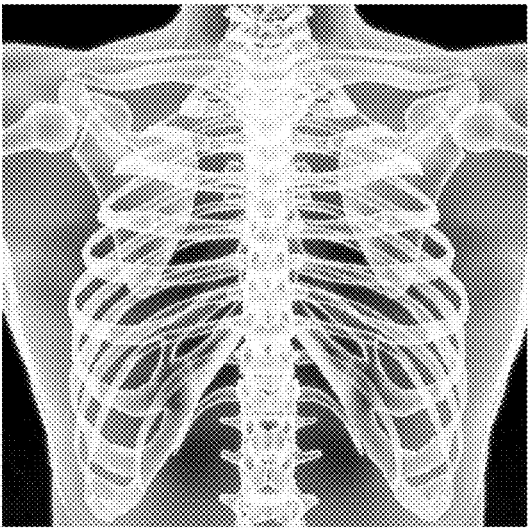
FIG. 9 is a fourth example of a user interface consistent with embodiments of the present disclosure.

FIGS. 7-9 depict additional user interfaces 700-900 consistent with embodiments of the present disclosure. The user interfaces of FIGS. 7-9 may provide a variety of different types of information to a variety of different audiences. For example, user interfaces 700-900 may be accessible to experts, whom may interact with the user interfaces 700-900 by providing user data (step 350). However, user interfaces 700-900 may be customized based on the user and his/her permissions to the data. For example, user interfaces 700-900 for a patient may have different data and fields than user interfaces 700-900 for an expert providing a second opinion. User interfaces 700-900 may also include tabs to enable access to different aspects of the patient's collective records.

FIG. 7 depicts user interface 700 which may provide a variety of information to the user. As depicted in FIG. 7, user interface 700 may include a medical summary field 701 and an opinion field 702. Medical summary field 701 may include data fields, such as biographic data, an initial diagnosis, a source of the initial diagnosis, a chief complaint, HPI, a proposed treatment, and a goal of consultation. Opinion field 702 may receive input from the user to input prompts that would be communicated to the patient. For example, opinion field 702 may include fields for summary to the patient, questions from the patient, and summary of next steps.

FIG. 8 depicts user interface 800 which may provide a timeline 801 with extracted data, metadata, and tags. The timeline 801 may be filtered by the event type, a condition, or a range of dates. Dates of timeline 801 may also be arranged in a variety of different chronological orders.

FIG. 9 depicts user interface 900 which may provide images acquired in method 300. For example, the records may be linked from the timeline 801 to provide an expert with additional information when desired.

Figure 10A:
Figure 10B:
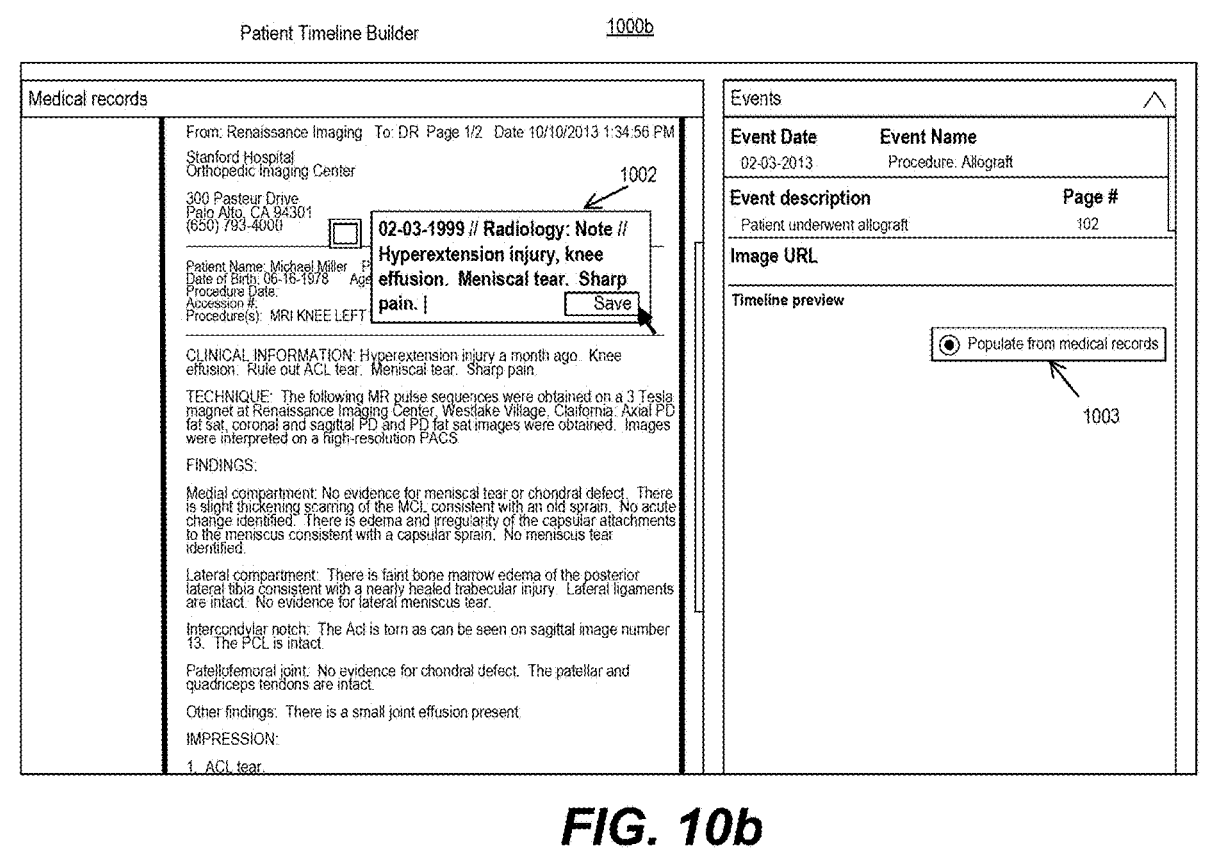

FIGS. 10*a*-10*c* illustrate another example of user interfaces 1000*a*-1000*c* consistent with embodiments of the present disclosure. In this example, a user interface is provided that allows a user to annotate a medical record for adding an event to the timeline. As depicted in FIG. 10*a*, when the user clicks on a spot in the medical record, system 100 may be configured to output a user interface 1000*a* including an option menu 1001 allowing the user to add a new annotation. Thereafter, the user may select the option menu 1001 to add a new annotation. As depicted in FIG. 10*b*, after receiving the user's selection of the option menu 1001, system 100 may be configured to output a user interface 1000*b* including a text box 1002 allowing the user to enter the annotation. The text box 1002 may further include an option for the user to save the annotation. The user interface 1000*b* may further include an option menu 1003 allowing the system 100 to build the timeline based on the annotation. For example, the user may click on the option menu 1003 after saving the newly entered annotation. As depicted in FIG. 10*c*, after receiving the user's selection of the option menu 1003, system 100 may be configured to output a user interface 1000*c* including the user's annotation in the timeline preview section. As described above, the user interfaces 1000*a*-1000*c* allow a user to build the timeline while reviewing the medical records, thereby causing minimal disruption to the user's reviewing workflow.

In the foregoing specification, embodiments have been described with reference to numerous specific details that may vary from implementation to implementation. Certain adaptations and modifications of the described embodiments may be made. Other embodiments may be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art may appreciate that these steps may be performed in a different order while implementing the same method.

What is claimed is:

1. A computerized system for dynamic data processing and graphical user interface generation, comprising:
   a network interface configured to request and receive, via a computer network from one or more sources in remote locations, electronic record data associated with an individual;
   an input filter configured to identify information in the electronic record data and to extract data from the identified information;
   a data selector configured to analyze the information;
   a timeline generator configured to generate, based on the analysis, interface information for displaying an interactive graphical user interface, wherein the interactive graphical user interface is configured to present an event timeline of events in the electronic record data, the event timeline including a sequence of health events arranged in a chronological order, and for each of the health events, the event timeline including an event date, an event name, an event description, and a hyperlink for accessing a medical record corresponding to the health event, and the interactive graphical user interface includes a first option menu and a second option menu when a medical record of the individual is displayed, the first option menu configured to add an annotation to the medical record of the individual, and the second option menu configured to add the annotation to the event timeline as a health event in the sequence of health events; and
   a display configured to provide the interactive graphical user interface based on the generated interface information.

2. The system of claim 1, wherein the data selector is further configured to analyze received user input associated with the electronic record data, and a database is configured to save the received user input.

3. The system of claim 1, wherein the extracted data includes at least one of information for the individual, a source of the electronic record data, a type of the electronic record data, a date stamp of the electronic record data, and test results in the electronic record data.

4. The system of claim 1, wherein the received electronic record data includes multiple media types.

5. The system of claim 4, wherein the multiple media types include at least textual documents and images.

6. The system of claim 1, further comprising a converter configured to convert a filetype of the medical record data to a Portable Network Graphics file format.

7. The system of claim 1, wherein the data selector is further configured to:
   determine a permission of a user operating the system; and
   determine a level of detail to include in the interactive graphical user interface based on the determined permission.

8. A computer-implemented method for dynamic data processing and graphical user interface generation, comprising:
   requesting and receiving, via a computer network from one or more sources in remote locations, electronic record data associated with an individual;
   identifying, by at least one processor of a computing system, information in the electronic record data;
   analyzing, by the at least one processor, the information;
   extracting, by the at least one processor, data from the analyzed information;
   generating, based on the analysis, interface information for displaying an interactive graphical user interface, wherein the interactive graphical user interface is configured to present an event timeline of events in the electronic record data, the event timeline including a sequence of health events arranged in a chronological order, and for each of the health events, the event timeline including an event date, an event name, an event description, and a hyperlink for accessing a medical record corresponding to the health event, and the interactive graphical user interface includes a first option menu and a second option menu when a medical record of the individual is displayed, the first option menu configured to add an annotation to the medical record of the individual, and the second option menu configured to add the annotation to the event timeline as a health event in the sequence of health events; and
   providing for display the interactive graphical user interface based on the generated interface information.

9. The computer-implemented method of claim 8, wherein the analysis includes received user input associated with the electronic record data, and the processor is further configured to save the user input in a database.

10. The computer-implemented method of claim 8, wherein the extracted data includes at least one of information for the individual, a source of the electronic record data, a type of the electronic record data, a date stamp of the electronic record data, and test results in the electronic record data.

11. The computer-implemented method of claim 8, wherein the received electronic record data includes multiple media types.

12. The computer-implemented method of claim 11, wherein the multiple media types include at least textual documents and images.

13. The computer-implemented method of claim 8, further comprising converting a filetype of the medical record data to a Portable Network Graphics file format.

14. The computer-implemented method of claim 8, further comprising:
   determining a permission of a user operating the system; and
   determining a level of detail to include in the interactive graphical user interface based on the determined permission.

15. A non-transitory computer readable medium storing a set of instructions that is executable by at least one processor of a computing system to cause the computing system to perform a method for dynamic data processing and graphical user interface generation, the method comprising:
   requesting and receiving, via a computer network from one or more sources in remote locations, electronic record data associated with an individual;

identifying, by at least one processor of a computing system, information in the electronic record data;

analyzing, by the at least one processor, the information;

extracting, by the at least one processor, data from the analyzed information;

generating, based on the analysis, interface information for displaying an interactive graphical user interface, wherein the interactive graphical user interface is configured to present an event timeline of events in the electronic record data, the event timeline including a sequence of health events arranged in a chronological order, and for each of the health events, the event timeline including an event date, an event name, an event description, and a hyperlink for accessing a medical record corresponding to the health event, and the interactive graphical user interface includes a first option menu and a second option menu when a medical record of the individual is displayed, the first option menu configured to add an annotation to the medical record of the individual, and the second option menu configured to add the annotation to the event timeline as a health event in the sequence of health events; and providing for display the interactive graphical user interface based on the generated interface information.

16. The non-transitory computer readable medium of claim 15, wherein the analyzing step includes received user input associated with the electronic record data, and the processor is further configured to save the user input in a database.

17. The non-transitory computer readable medium of claim 15, wherein the extracted data includes at least one of information for the individual, a source of the electronic record data, a type of the electronic record data, a date stamp of the electronic record data, and test results in the electronic record data.

18. The non-transitory computer readable medium of claim 15, wherein the received electronic record data includes textual documents and images.

19. The non-transitory computer readable medium of claim 15, wherein the set of instructions that is executable by the at least one processor of the computing system to cause the computing system to further perform:

converting a filetype of the medical record data to a Portable Network Graphics file format.

20. The non-transitory computer readable medium of claim 15, wherein the set of instructions that is executable by the at least one processor of the computing system to cause the computing system to further perform:

determining a permission of a user operating the system; and determining a level of detail to include in the interactive graphical user interface based on the determined permission.

* * * * *